Oct. 23, 1951   R. G. LE TOURNEAU   2,572,636
SELF-PROPELLED LOGGING ARCH
Filed Jan. 25, 1950

INVENTOR:
R. G. LeTourneau
BY
J. D. Copeland Jr.
AGENT

Patented Oct. 23, 1951

2,572,636

UNITED STATES PATENT OFFICE 2,572,636

SELF-PROPELLED LOGGING ARCH

Robert G. Le Tourneau, Longview, Tex., assignor to R. G. Le Tourneau, Inc., Peoria, Ill., a corporation of California Application January 25, 1950, Serial No. 140,523

4 Claims. (Cl. 214—65.3)

This invention relates to machines of a class known as logging arches which are used to drag timber out of the woods. Arches of this class are usually drawn behind a tract type tractor.

The primary object of this invention is to provide an arch of this general type which is self-propelled by means of a two wheel tractor.

Another object of this invention is to provide a self-propelled logging arch in which the arch portion which includes the rear wheels is adjustable lengthwise of the machine, whereby to vary the wheelbase over a considerable distance. This feature permits the logs to extend under the arch a substantial distance so that more of their weight is picked up and consequently the drag is reduced at the free end.

A further object is to provide a machine of this type in which the cable for supporting the logs is powered by a separate electric winch unit. This feature avoids the difficulty of many machines employing a power take-off winch, wherein the forward motion of the machine must be stopped before utilizing their winch. One advantage of this feature is when the machine has slacked off its load to pull out of a rut, it may then reel in its logs without stopping the forward motion when a firmer footing is encountered.

Yet another object is to provide a logging arch which contains a plurality of electric winch units to facilitate handling of small logs which are carried more easily in several small groups than in one or more large groups.

A still further object is to provide an all rubber-tires self-propelled logging arch which is capable of much greater speeds on haul roads than conventional track-laying vehicles and yet is also capable of operating thru mud and in difficult off-the-road operations.

Figure 1:
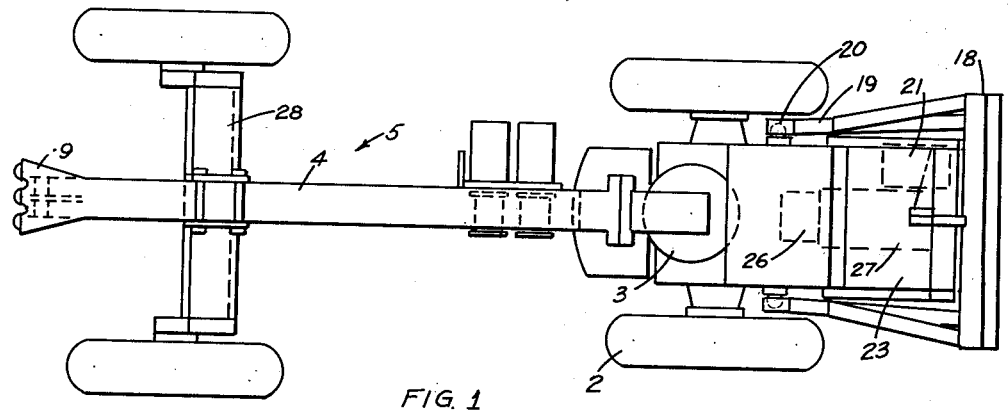
Fig. 1 represents a plan view of this self-propelled logging arch.

Referring now to the drawing, this self-propelled logging arch is seen to consist essentially of a two wheel tractor 1, including a frame 1a, drive wheels 2, and a rearwardly facing upstanding power hitch 3, to which is coupled the top beam 4 of trailing unit 5, which unit also includes an arch-shaped rear wheel structure 6 supported at its lower end by wheels 7 and supporting at its upper end the top beam 4 by means of a saddle structure 8. The rear end of beam 4 terminates in a fairlead unit 9 including three spaced vertical rollers 10 and a pair of horizontally aligned rollers 11. These rollers separate and guide cables 12 and 13 of electric winches 14 and 15 located forward on the underside of beam 4. The separately powered cables are extremely useful in handling several bundles of small logs by means of multiple chokers on each cable.

Steering of this machine is accomplished by means of a power steering hitch 3 including an electric motor unit 3a, which causes the tractor and its wheels to turn relative to the trailing unit. Details of a hitch of this type may be observed by reference to my Patent No. 2,400,868, granted May 28, 1946. This method of steering together with the electric winches on the trailing unit will provide a very effective means of pulling out of ruts. When the machine is thus bogged down, the electric winches may be used to lower the load of logs to the ground, and the tractor steered from side to side while engaged in a forward gear, then when the tractor has wormed its way to a firmer footing, it may keep right on with its forward motion, so that no momentum is lost, and reel in its load of logs while travelling.

The saddle structure 8 is U-shaped and is held in place by top bolts 16 and lock bolts 17. These bolts are all loosened when it is desired to adjust the wheelbase, in which case the adjustment may be made by holding fast the rear wheel structure 6, as by blocking under wheels 7 and moving the tractor forward or back under its own power. When the structure is thus positioned at the desired location, the bolts are tightened and the machine again becomes an integral vehicle with a different wheelbase. The advantage here is that the shortest permissible wheelbase may be obtained that is possible with a given load. As the load increases, the rear wheel structure must be moved rearward until the moment of the tractor weight and its distance forward of the rear wheels is greater by a safe margin than the moment due to the log weight and its moment arm beyond the rear wheels. In order to accomplish this desired adjustability, the top beam 4 of the trailer unit is made substantially parallel to the ground.

In order to facilitate the off-road travel of this machine, there has been installed a bulldozer blade 18 at the forward end of the tractor 1. This blade is supported from the tractor by pusher arms 19 pivoted as at 20 to the tractor frame. An electric winch 21, mounted on the tractor frame within the enclosure of the A frame 22 and engine hood 23, operates cable 24 which passes thru winches 25 of the A frame and controls the position of blade 18.

The electrical units of this machine, i. e. blade control 21, steering 3a, and the logging winches 14 and 15, are all powered from an in-line generator 26 operated by the tractor engine 27.

Figure 3:
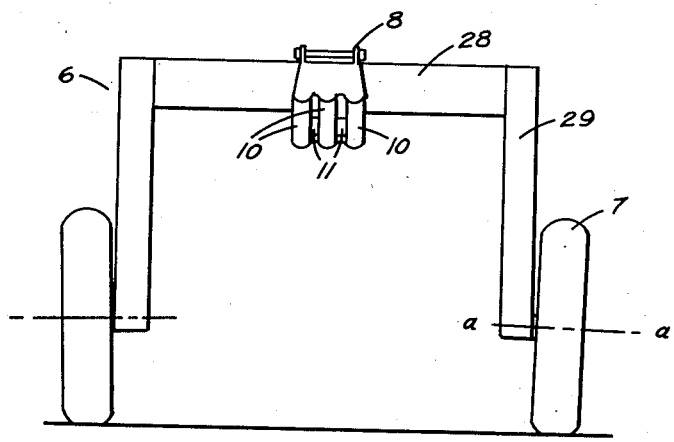
Fig. 3 is an end view of the rear wheel group and that portion of the top beam which together therewith constitutes the "arch" portion of this machine.

The rear wheel structure 6 is seen in Fig. 3 to consist of top cross-beam 28 attached to saddle 8 at its midsection, and depending side arms 29. Wheels 7 are journalled to side arms 29 at a slight angle from the horizontal as shown by center lines $a$—$a$. This construction permits the wheels 7 to assume a nearly vertical position when the rear wheel structure 6 is carrying a heavy load.

Figure 2:
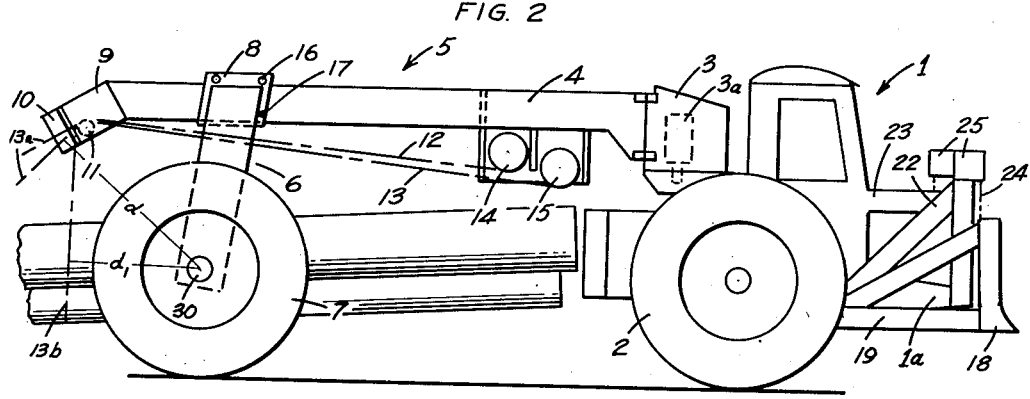
Fig. 2 is a side elevational view of the same.

In Fig. 2 the facility of this long wheelbase self-propelled logging arch to pick up a substantial length of the logs will be observed. Consequently a greater weight of the logs will be carried by the cable; this will result in a greatly decreased drag at the free end of the logs. Where the logs are picked up near their ends as in conventional arches, the cables will assume a position shown at 13a due to the drag. Whereas in this rig when a considerable weight of the logs is picked up, the cable will be nearly vertical as at 13b. It has been found from actual tests and observation that better traction is obtained by the tractor 1 when the logs are picked up in this manner. The reason for this increased traction is believed to be the fact that the lever arm distance $d_1$ from the wheel center 30 to the cable position 13b is considerably less than the distance $d$ to cable position 13a, so that the greater weight carried by the 13b position does not adversely effect the total moment tending to decrease the weight on wheels 2, since the total moment force is actually a combination of log weight and drag. In this arrangement it is apparent that the decreased drag of position 12b provides more tractive advantage than the lesser vertical weight of position 13a.

From the foregoing description, it will be readily seen that there has been produced such a device as substantially fulfills the objects of the invention as set forth herein.

While this specification sets forth in detail the present and preferred construction of the device, still in practice such deviation from such detail may be resorted to as do not form a departure from the spirit of the invention as defined by the appended claims.

Having thus described my invention, the following is claimed as new and useful, and upon which Letters Patent is desired:

1. A self-propelled logging arch comprising a prime mover including an engine and drive wheels, a trailing unit attached to the prime mover in steerable and vertically rigid relation, the trailing unit including an overhead longitudinal main beam, fairlead rollers at the rear end thereof, an inverted U-shaped rear wheel structure adjustably located at selective positions along the length of said beam, winch units intermediate the length of the beam, log hoisting cables controlled by said winch units and reeved through said rollers for suspending a load of logs under the trailing unit to be carried therewith.

2. A self-propelled logging arch comprising a prime mover including an engine, a generator, and drive wheels, a trailing unit attached to the prime mover in steerable and vertically rigid relation, the trailing unit including an overhead longitudinal main beam, fairlead rollers at the rear end thereof, winch units intermediate the length of the beam, log hoisting cables controlled by said winch units and reeved through said rollers, said winch units being powered from said generator on the prime mover; a rear wheel structure adjustably secured to said main beam and supporting said main beam in a position substantially parallel to the ground.

3. A self-propelled logging arch comprising a two wheel tractor including a frame, drive wheels supporting the frame, an engine ahead of the drive wheels, a power steering hitch on the frame at the rear thereof, a trailing unit attached to the tractor by means of said power steering hitch, said trailing unit including a longitudinal main beam attached to said steering hitch in a position parallel to the ground line, a rear wheel structure supporting said beam from the ground, said rear wheel structure comprising an inverted U-shaped member, wheels journalled to said member, a fairlead assembly at the rear end of said beam, and power means on the trailing unit including cables which pass thru said fairlead assembly to engage a load of logs and suspend said logs under the main beam of the trailing unit, and means whereby said rear wheel structure may be adjusted lengthwise of said longitudinal beam to vary the wheelbase of said logging arch and thereby change the loading conditions on said drive wheels for different travel conditions.

4. A self-propelled vehicle comprising a two wheel tractor including a frame, drive wheels supporting the frame, an engine ahead of the drive wheels, a hitch on the tractor above the wheels, a trailing unit comprising a longitudinal main beam attached to said hitch, said beam being positioned horizontally and including a fairlead assembly at its rear end, a rear wheel structure supporting said beam from the ground, wheels journalled to said structure at laterally spaced points, a cable system associated with said fairlead assembly for suspending a load from said beam and between said wheels, said rear wheel structure including a saddle structure at its upper end, and releasable means for fastening said saddle structure to said main beam whereby said rear wheel structure may be selectively positioned along said beam to vary the wheel base of the vehicle and change the loading conditions on said drive wheels.

ROBERT G. LE TOURNEAU.

REFERENCES CITED

The following references are of record in the file of this patent:

UNITED STATES PATENTS

| Number | Name | Date |
|---|---|---|
| 1,710,122 | Sorenson | Apr. 23, 1929 |
| 2,001,839 | De Bou et al. | May 21, 1935 |
| 2,305,630 | McNeil | Dec. 22, 1942 |
| 2,400,868 | Le Tourneau | May 28, 1946 |
| 2,419,442 | Dorsey, Jr. | Apr. 22, 1947 |
| 2,433,822 | Bartholomew | Dec. 30, 1947 |
| 2,439,139 | Le Tourneau | Apr. 6, 1948 |
| 2,452,338 | Thompson | Oct. 26, 1948 |
| 2,502,681 | Swanson | Apr. 5, 1950 |
| 2,504,954 | Allin | Apr. 25, 1950 |